(12) United States Patent
Zhou et al.

(10) Patent No.: US 8,894,883 B2
(45) Date of Patent: Nov. 25, 2014

(54) YTTRIUM OXIDE PHOSPHOR MIXTURE AND PREPARATION METHOD THEREOF

(75) Inventors: Mingjie Zhou, Guangdong (CN); Ting Lv, Guangdong (CN); Yewen Wang, Guangdong (CN); Wenbo Ma, Guangdong (CN)

(73) Assignee: Ocean's King Lighting Science & Technology Co., Ltd., Guangdong (CN)

( * ) Notice: Subject to any disclaimer, the term of this patent is extended or adjusted under 35 U.S.C. 154(b) by 105 days.

(21) Appl. No.: 13/702,345

(22) PCT Filed: Jun. 12, 2010

(86) PCT No.: PCT/CN2010/073891
§ 371 (c)(1),
(2), (4) Date: Dec. 6, 2012

(87) PCT Pub. No.: WO2011/153715
PCT Pub. Date: Dec. 15, 2011

(65) Prior Publication Data
US 2013/0075662 A1    Mar. 28, 2013

(51) Int. Cl.
*C09K 11/54* (2006.01)
*C09K 11/78* (2006.01)
*C09K 11/02* (2006.01)
*C09K 11/77* (2006.01)
*B82Y 30/00* (2011.01)

(52) U.S. Cl.
CPC .......... *C09K 11/025* (2013.01); *C09K 11/7769* (2013.01); *C09K 11/7787* (2013.01); *C09K 11/7767* (2013.01); *C09K 11/7784* (2013.01); *B82Y 30/00* (2013.01); *Y10S 977/773* (2013.01)
USPC .............. 252/301.4 R; 252/301.6 R; 977/773

(58) Field of Classification Search
CPC ............. C09K 11/025; C09K 11/7787; C09K 11/7769
USPC ..................................... 252/301.4 R, 301.6 R
See application file for complete search history.

(56) References Cited

U.S. PATENT DOCUMENTS

2013/0062563 A1* 3/2013 Zhou et al. ............. 252/301.6 R
2013/0071689 A1* 3/2013 Zhou et al. ..................... 428/697

FOREIGN PATENT DOCUMENTS

CN        101775278 A     7/2010

* cited by examiner

*Primary Examiner* — Carol M Koslow
(74) *Attorney, Agent, or Firm* — Rosenberg, Klein & Lee

(57) ABSTRACT

Fluorescent materials and preparation methods thereof are provided. The fluorescent materials are represented by the general formula: M, $Zn_{1-x}Al_xO$ and $Y_2O_3$: Re, wherein Re is at least one selected from Eu and Tb, M is at least one selected from Ag, Au, Pt and Pd in the form of nano-particle, and $0<x\leq0.05$. The said methods include the following steps: step 1, preparing a colloid of $Zn_{1-x}Al_xO$; step 2, preparing a colloid of Y and Re containing the metal element M; step 3, mixing the colloid of $Zn_{1-x}Al_xO$ with the colloid of Y and Re, aging and heating treatment to form the fluorescent materials. Compared to the $Y_2O_3$ fluorescent materials in the art the present fluorescent materials have higher luminescence efficiency, conductivity, long life and industrial applicability.

10 Claims, 1 Drawing Sheet

YTTRIUM OXIDE PHOSPHOR MIXTURE AND PREPARATION METHOD THEREOF

FIELD OF THE INVENTION

The present disclosure relates to the field of optoelectronics and illumination techniques, and more particularly relates to an yttrium oxide phosphor mixture and preparation method thereof.

BACKGROUND OF THE INVENTION

With more and more wide development and application of high-quality display illumination devices in work and life, high-efficiency phosphor has become an increasingly important application material. The traditional oxide phosphor exhibits a good stability, however, its luminous efficiency subjected to the low-voltage electron beam is not high enough.

SUMMARY OF THE INVENTION

Accordingly, it is necessary to provide an yttrium oxide phosphor mixture with high luminous efficiency.

In addition, it is necessary to provide a preparation method of the yttrium oxide phosphor mixture with high luminous efficiency.

An yttrium oxide phosphor mixture is represented by the chemical formulae:

$$M, Zn_{1-x}Al_xO \text{ and } Y_2O_3 : Re;$$

wherein Re is at least one selected from Eu and Tb, M is at least one selected from the group consisting Ag, Au, Pt and Pd in the form of nano-particle, and $0 < x \leq 0.05$.

Preferably, the doping concentration of Re in $Y_2O_3$ is from 0.1% to 10%; the mole ratio of M to the sum of Re and Y is from 0.00002:1 to 0.01:1; the mole ratio of $Zn_{1-x}Al_xO$ to the sum of Re and Y is from 0.01:1 to 2:1.

A preparation method of an yttrium oxide phosphor mixture comprises the following steps:

S1, preparing a $Zn_{1-x}Al_xO$ colloid, wherein $0 < x \leq 0.05$;

S2, preparing a Y, Re colloid containing metal nano-particle M or ion M; wherein Re is at least one selected from Eu and Tb, M is at least one selected from the group consisting Ag, Au, Pt and Pd; and S3, mixing the $Zn_{1-x}Al_xO$ colloid with the Y, Re colloid containing M in water bath with stirring to produce a mixture colloid, aging and heat treating the mixture colloid to obtain the yttrium oxide phosphor mixture.

Preferably, the step S1 comprises: weighing raw materials of zinc salt and aluminum salt, respectively; dissolving with a solvent; adding stabilizing agent to prepare a mixed solution having a total mole concentration of zinc ion and aluminum ion of 0.05 to 0.70 mol/L; stirring the mixed solution in a water bath of 40° C. to 70° C. for 4 to 8 hours to obtain a precursor solution of $Zn_{1-x}Al_xO$; placing the precursor solution of $Zn_{1-x}Al_xO$ in a 60° C. to 90° C. oven and aging for 40 to 60 hours to obtain the $Zn_{1-x}Al_xO$ colloid.

The zinc salt is selected from at least one of the group consisting of $Zn(CH_3COO)_2 \cdot 2H_2O$, $Zn(NO_3)_2 \cdot 6H_2O$, $ZnCl_2 \cdot 2H_2O$ and $ZnSO_4 \cdot 7H_2O$; the aluminum salt is selected from at least one of the group consisting of $Al(NO_3)_3 \cdot 9H_2O$, $AlCl_3 \cdot 6H_2O$ and $Al_2(SO_4)_3$; the solvent is selected from at least one of the group consisting of $C_3H_8O_2$ and aqueous ethanol solution; and the volume ratio of ethanol to deionized water of the aqueous ethanol solution is in a range of 3:1 to 7:1; the stabilizing agent is selected from at least one of the group consisting of $C_2H_7NO$, $C_4H_{11}NO_2$ and $C_6H_{15}O_3N$.

Preferably, the step S2 comprises: S21, weighing raw materials of Y and Re respectively according to a doping concentration of Re in $Y_2O_3$ of 0.1% to 10% to prepare a Y, Re solution having a sum ion concentration of 0.1 mol/L to 2.00 mol/L; wherein the Y, Re solution is a Y, Re aqueous solution or an aqueous ethanol solution; S22, measuring the Y, Re solution, adding ethanol, raw material of M, a complexing agent and a surfactant, successively, to prepare a Y, Re alcohol aqueous solution; wherein the ratio of water to alcohol in the Y, Re alcohol aqueous solution is from 1:1 to 9:1, the sum of mole concentration of Y and Re is 0.1 mol/L to 1.0 mol/L, the mole ratio of the complexing agent to the sum of Y and Re is from 1:1 to 5:1, the concentration of the surfactant is 0.05 mol/L to 0.20 mol/L; wherein deionized water can be added to prepare the Y, Re alcohol aqueous solution; S23, stirring the Y, Re alcohol aqueous solution in a water bath of 40° C. to 60° C. for 4 to 6 hours, and placing the Y, Re alcohol aqueous solution in a 60° C. to 90° C. oven and aging for 56 to 90 hours to obtain the Y, Re colloid containing metal nano-particle M or ion M.

Preferably, the raw materials of Y and Re are metal oxides, hydrochloric acid salts, nitrates, or oxalates; the metal oxides are $Y_2O_3$, $Eu_2O_3$, $Tb_4O_7$; the hydrochloric acid salts are $YCl_3 \cdot 7H_2O$, $EuCl_3$, $TbCl_3 \cdot 6H_2O$; the nitrates are $Y(NO_3)_3 \cdot 6H_2O$, $Eu(NO_3)_3 \cdot 6H_2O$, $Tb(NO_3)_3 \cdot 6H_2O$; the oxalates are oxalates which can provide $Y^{3+}$, $Eu^{3+}$, and $Tb^{3+}$; the raw material of M is Ag, Au, Pt and Pd in the form of nano-particle; the raw material of M is aqueous or alcohol solution of $AgNO_3$, $HAuCl_4$, $H_2PtCl_6$, $H_2PdCl_4$; the complexing agent is citric acid; the surfactant is selected from at least one of the group consisting of polyethylene glycol 6000, polyethylene glycol 8000, polyethylene glycol 10000 and polyethylene glycol 20000.

Preferably, during the preparation of the Y, Re aqueous solution, if the hydrochloric acid salts or the nitrates are used as the raw materials of Y and/or Re, the raw materials of Y and/or Re are dissolved in a vessel directly. If the metal oxides or the oxalates are used as the raw materials of Y and/or Re, the metal oxides or the oxalates corresponding to the Y, Re are dissolved in a vessel with hydrochloric acid or nitric acid under a condition of 15° C. to 100° C. with stirring.

Preferably, in step S3, the ratio of the sum of molar amount of Zn and Al to the sum of molar amount of Re and Y in the mixture colloid is in a range of 0.01:1 to 2:1; the temperature of water bath is 15° C. to 80° C., the stirring time is 1 to 4 hours; the aging is placing the mixture colloid in a 100° C. to 200° C. oven for 48 to 96 hours; the heat treating is placing the mixture colloid in a crucible at 800° C. to 1300° C. for 0.5 to 6 hours under an air atmosphere or a reducing atmosphere. The reducing atmosphere are powdered carbon or a mixture of nitride ($N_2$) and hydrogen $H_2$ where the proportion of hydrogen to nitrogen in the hydrogen-nitrogen atmosphere is 95:5.

Preferably, when the Re in the yttrium oxide phosphor contains Terbium, the reducing atmosphere is used; when the Re contains only Europium, the air atmosphere is used.

Metal nano-particles are added into the yttrium oxide phosphor doped with a rare earth element, and since the metal nano-particles has large surface area, the internal quantum efficiency of the phosphor is improved due to the surface plasmon coupling effect, thereby improving the luminous efficiency of the phosphor.

Meanwhile, the material is oxide phosphor, which has a long work life. By changing the type and ratio of Re, the phosphor can radiate light with different wavelength. The addition of the conductive material of $Zn_{1-x}Al_xO$ leads to further improvement of conductivity of the phosphor, thus enhancing the emission luminance of the phosphor. The conductivity of the phosphor can be further improved by changing the amount of Zn and Al in $Zn_{1-x}Al_xO$.

The preparation method is a simple, low equipment requirement, and has a short preparation period; the method is proved feasible after several practices.

DETAILED DESCRIPTION

Figure 1:
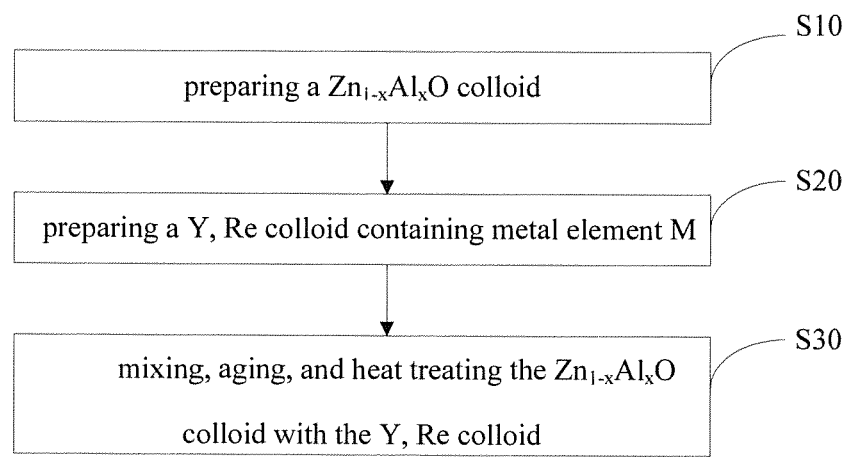
FIG. 1 is a flowchart of an embodiment of a method for preparing an yttrium oxide phosphor mixture.

The surface plasmon (SP) is a type of a wave spreading along the interface between metal and dielectric, and the amplitude exponentially decay as the distance away from the interface increases. When the metal surface structure is changed, the nature, dispersion relation, excitation mode, and coupling effects of surface plasmon polaritons (SPPs) will change significantly. The electromagnetic fields caused by the SPPs, not only can restrain the spread of light waves in the subwavelength structure, but also can generate and manipulate the electromagnetic radiation from the light frequency to the microwave band, thus active manipulation of light propagation is achieved, and to increase the optical density of states of the luminescent materials and enhances spontaneous emission rate. In addition, by using the surface plasmon coupling effect, the internal quantum efficiency of the luminescent material can be greatly improved, thus enhancing the emission intensity of the material.

Accordingly, when preparing the phosphor, metal nano-particle and conductive material can be added, such that the emission intensity of the phosphor can be enhanced via the surface plasmon coupling effect and excellent conductivity. How to effectively integrate surface plasmon effect and excellent conductive properties in the phosphor has been an important research in the field of materials science, optoelectronics and illumination technology.

An yttrium oxide phosphor mixture, which is conductive and integrated with SP effect, is provided. A preparation method of the yttrium oxide phosphor mixture is provided. The phosphor colloid is prepared by sol-gel method, and conductive material and metal nano-particles are added in the phosphor colloid, thus the emission intensity of the phosphor can be enhanced.

An yttrium oxide phosphor mixture, which includes $Y_2O_3$, rare earth element Re, metal nano-particle M, and $Zn_{1-x}Al_xO$, is represented by the chemical formulae:

M, $Zn_{1-x}Al_xO$ and $Y_2O_3$:Re;

wherein Re is at least one selected from Eu and Tb, M is at least one selected from the group consisting Ag, Au, Pt and Pd in the form of nano-particle, and $0<x\leq0.05$.

In a preferable embodiment, Re is doped in $Y_2O_3$, and the doping concentration is from 0.1% to 10%. The mole ratio of M to the sum of Re and Y is from 0.00002:1 to 0.01:1. The mole ratio of $Zn_{1-x}Al_xO$ to the sum of Re and Y is from 0.01:1 to 2:1. The metal nano-particles are added into the yttrium oxide phosphor doped with Re, thus improving the luminous efficiency of the phosphor, meanwhile, the material is oxide phosphor, which has a long work life. By changing the type and ratio of Re, the phosphor can radiate light with different wavelength. The addition of the conductive material of $Zn_{1-x}Al_xO$ leads to further improvement of conductivity of the phosphor, thus enhancing the emission luminance of the phosphor. The conductivity of the phosphor can be further improved by changing the amount of Zn and Al in $Zn_{1-x}Al_xO$.

An embodiment of a preparation method of the yttrium oxide phosphor mixture is provided with the following technical solutions:

One, selection of the chemical compounds and raw materials:

1. selection of the raw materials in preparation of $Zn_{1-x}Al_xO$ colloid.

Selection of zinc salt: zinc acetate ($Zn(CH_3COO)_2 \cdot 2H_2O$), zinc nitrate ($Zn(NO_3)_2 \cdot 6H_2O$), zinc chloride ($ZnCl_2 \cdot 2H_2O$), zinc sulfate ($ZnSO_4 \cdot 7H_2O$) of analytical grade;

Selection of aluminum salt: aluminum nitrate ($Al(NO_3)_3 \cdot 9H_2O$), aluminum chloride ($AlCl_3 \cdot 6H_2O$), aluminum sulfate ($Al_2(SO_4)_3$), .etc of analytical grade;

Selection of stabilizer: monoethanolamine ($C_2H_7NO$), diethanolamine ($C_4H_{11}NO_2$), triethanolamine ($C_6H_{15}O_3N$) of analytical grade;

Selection of solvent: ethylene glycol monomethyl ether ($C_3H_8O_2$), ethanol solution (a ratio of ethanol to deionized water ranges from (3-7): 1) of analytical grade.

2. selection of the chemical compounds and raw materials in preparation of Y, Re colloid containing metal nano-particle M or ion M:

The raw materials of metal oxide are $Y_2O_3$, $Eu_2O_3$, $Tb_4O_7$;

The raw materials of hydrochloric acid salts are $YCl_3 \cdot 7H_2O$, $EuCl_3$, $TbCl_3 \cdot 6H_2O$;

The raw materials of nitrates are $Y(NO_3)_3 \cdot 6H_2O$, $Eu(NO_3)_3 \cdot 6H_2O$, $Tb(NO_3)_3 \cdot 6H_2O$;

The raw materials of oxalates are oxalates which can provide $Y^{3+}$, $Eu^{3+}$, and $Tb^{3+}$;

Analytical grade hydrochloric acid or analytical nitrate ($HNO_3$: 65%~68%, concentration: 14.4~15.2 mol/L; HCl: 36~37%, concentration: 11.7 mol/L) are used to dissolve oxide and oxalates;

The solvent is deionized water ($H_2O$) or mixed solution containing anhydrous ethanol ($CH_3CH_2OH$) and deionized water, where the ratio of ethanol to the deionized water is in a range of (1~9):1;

The complexing agent is analytical grade citric acid ($C_6H_8O_7 \cdot H_2O$);

The surfactant is selected from at least one of the group consisting of polyethylene glycol 6000, polyethylene glycol 8000, polyethylene glycol 10000 and polyethylene glycol 20000 of analytical grade.

The raw materials of M are nano-particles of Ag, Au, Pt, Pd; or such salts can be dissolved in water or ethanol as $AgNO_3$, $HAuCl_4$, $H_2PtCl_6$, $H_2PdCl_4$.

Two, the preparation of phosphor

FIG. 1 illustrates a preparation method of the phosphor including the following steps:

S10, preparation of a 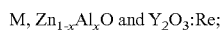 colloid.

Zinc salt and aluminum salt with a certain mass ratio are weighed respectively according to the chemical formula of $Zn_{1-x}Al_xO$, where $0<x\leq0.05$. After the zinc salt and aluminum salt are dissolved with a solvent, stabilizing agent is added to prepare a mixed solution having a total mole concentration of zinc ion and aluminum ion of from 0.05 to 0.70 mol/L. The mixed solution is stirred in a water bath of 40° C. to 70° C. for 4 to 8 hours to obtain a precursor solution, and then the precursor solution is placed in a 60° C. to 90° C. oven and aged for 40 to 60 hours to obtain the $Zn_{1-x}Al_xO$ colloid.

S20, preparation of Y, Re colloid containing metal element.

Raw materials of Y and Re are weighed respectively according to a doping concentration of Re in $Y_2O_3$ of 0.1% to 10% to prepare a Y, Re solution having a sum ion concentration of 0.1 mol/L to 2.00 mol/L, where the Y, Re solution is a Y, Re aqueous solution or an aqueous ethanol solution. The Y, Re solution is measured, and ethanol, raw material of M, a complexing agent and a surfactant are added successively, to prepare a Y, Re alcohol aqueous solution, where the ratio of water to alcohol in the Y, Re alcohol aqueous solution is from 1:1 to 9:1, the sum of mole concentration of Y and Re is 0.1 mol/L to 11.0 mol/L, the mole ratio of the complexing agent to the sum of Y and Re is from 1:1 to 5:1, the concentration of the surfactant is 0.05 mol/L to 0.20 mol/L. In a preferable embodiment, when preparing the Y, Re alcohol aqueous solution, deionized water can be added to maintain the alcohol-water ratio in the Y, Re alcohol aqueous solution. The Y, Re alcohol aqueous solution is stirred in a water bath of 40° C. to 60° C. for 4 to 6 hours, and placed in a 60° C. to 90° C. oven and aged for 56 to 90 hours to obtain the Y, Re colloid containing metal element.

When the added raw material of M is metal nano-particle, the metal element in the Y, Re colloid is in a form of nano-particle; when the added raw material of M is metal salt solution, the metal element in the Y, Re colloid is in a form of ion.

During the preparation of the Y, Re aqueous solution, if the hydrochloric acid salts or the nitrates $Y(NO_3)_3.6H_2O$, $Eu(NO_3)_3.6H_2O$, $Tb(NO_3)$, $YCl_3.7H_2O$, $EuCl_3$, $TbCl_3.6H_2O$ are used as the raw materials, a proper amount of the chemical compounds is weighed and dissolved in a vessel directly with deionized water. If the metal oxides or the oxalates are used as the raw materials, the metal oxides or the oxalates corresponding to the Y, Re are dissolved in a vessel with analytical grade hydrochloric acid or nitric acid under a condition of 15° C. to 100° C. with stirring.

S30, mixing, aging and heat treating of $Zn_{1-x}Al_xO$ colloid and Y, Re colloid.

The $Zn_{1-x}Al_xO$ colloid and the Y, Re colloid are mixed while maintaining the ratio of the sum of molar amount of Zn and Al to the sum of molar amount of Re and Y in the mixture colloid being in a range of 0.01:1 to 2:1. The mixture is then stirred in a water bath of 15° C. to 80° C. for 1 to 4 hours to produce a mixture colloid. The mixture colloid is aged in a 100° C. to 200° C. oven for 48 to 96 hours. After drying, the mixture colloid is placed in a crucible at 800° C. to 1300° C. for 0.5 to 6 hours under an air atmosphere or a carbon reducing atmosphere or a hydrogen-nitrogen reducing atmosphere to obtain the yttrium oxide phosphor mixture, where the proportion of hydrogen to nitrogen in the hydrogen-nitrogen atmosphere is 95:5.

In the preferable embodiment, when the Re in the yttrium oxide phosphor contains Terbium, the reducing atmosphere is used; when the Re contains only Europium, the air atmosphere is used. M in ionic state is reduced to a simple substance of nano-particle state during the heat treatment operation. When the Re contains only Europium, the air atmosphere is used, however, it is found that M in ionic state is also reduced to obtain the simple substance of nano-particle state.

Figure 2:
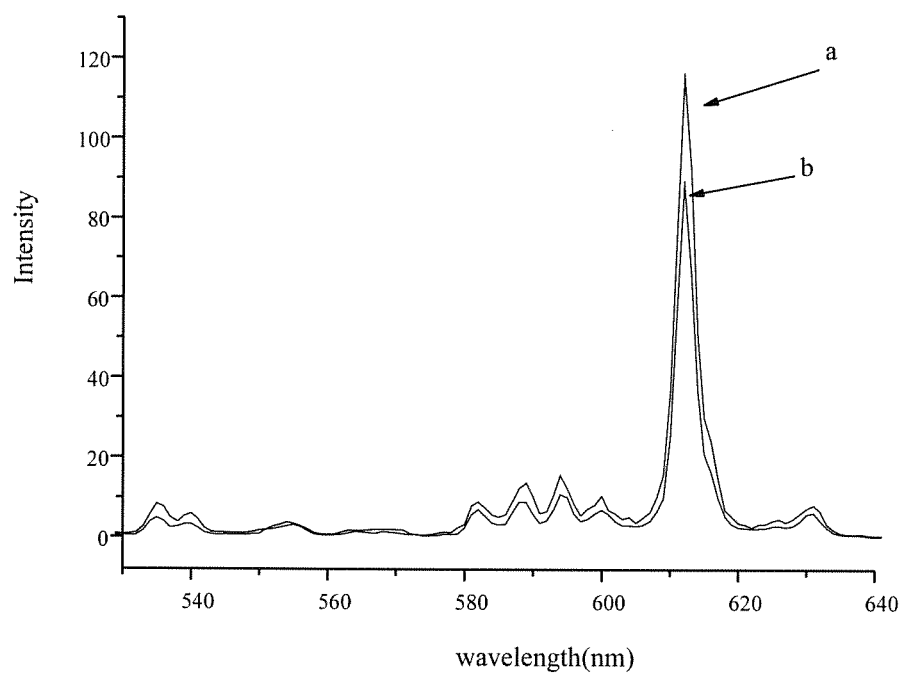
FIG. 2 shows a spectrum of the yttrium oxide phosphor mixture prepared according to the present invention and commercial broadband spectrum phosphor under a cathode ray excitation.

FIG. 2 shows a spectrum of the yttrium oxide phosphor mixture prepared according to the present invention and commercial broadband spectrum phosphor under a cathode ray excitation.

The spectrum is obtained using Shimadzu RF5301PC spectrometer under a 5kv voltage test conditions, where a represents a spectra of an $Y_2O_3$:Re phosphor adding Ag nano-particle and $Zn_{1-x}Al_xO$ prepared according to Example 1, b represents a spectra of commercial broadband spectrum phosphor. It is calculated by Shimadzu RF5301PC spectrometer software that, the integral area of a is 1.49 times of the integral area of b.

In other words, the luminous efficiency of the $Y_2O_3$:Re phosphor adding Ag nano-particle and $Zn_{1-x}Al_xO$ prepared according to Example 1 is significantly improved compared to the commercial broadband spectrum phosphor.

The preparation method of the yttrium oxide phosphor mixture will further be described below mainly with reference to the specific examples.

EXAMPLE 1

2.1292g of $Zn(CH_3COO)_2.2H_2O$, 0.1125 g of $Al(NO_3)_3.9H_2O$, and 0.6 ml $C_2H_7NO$ were weighed and placed in a vessel at room temperature. Glycol ether was added to make 50 ml, stirred at a 60° C. water bath for 4 hours to obtain a clear precursor solution of $Zn_{0.97}Al_{0.03}O$. The precursor solution of $Zn_{0.97}Al_{0.03}O$ was placed in a 60° C. oven and aged for 70 hours to form an even $Zn_{0.97}Al_{0.03}O$ colloid.

37.9180 g of $Y(NO_3)_3.6H_2O$ and 0.4441 g of $Eu(NO_3)_3.6H_2O$ were weighed and dissolved in deionized water at room temperature to prepare a 100 ml of Y, Eu aqueous solution of 1 mol/L with a doping concentration of Eu in Y of 1%. 4 ml of Y, Eu aqueous solution of 1 mol/L were measured, 1 ml of deionized water and 35 ml of anhydrous ethanol were added as solvent, 0.4 ml of $AgNO_3$ solution of 0.01 mol/L was added, 3.0742 g of citric acid and 5 g of polyethylene glycol 10000 were added, stirred in a 60° C. water bath for 4 hours to obtain a clear precursor solution of Y, Eu colloid. The obtained precursor solution of Y, Eu colloid was placed in a 90° C. oven and aged for 40 hours to form an even Y, Eu colloid.

1ml of resulting $Zn_{0.97}Al_{0.03}O$ colloid was added into the Y, Eu colloid, the mixture was stirred at 15° C. for 2 hours, dried in a 100° C. oven for 48 hours, insulated in an 800° C. muffle furnace for 2 hours to obtain $Y_2O_3$:Eu phosphor doped with Ag nano-particle and $Zn_{0.97}Al_{0.03}O$.

EXAMPLE 2

0.5460g of $Zn(CH_3COO)_2.2H_2O$, 0.0047g of $Al(NO_3)_3.9H_2O$, and 0.4ml $C_6H_{15}O_3N$ were weighed and placed in a vessel at room temperature. A mixed solution containing ethanol and water with a volume ratio of 4:1 was added to make 50 ml, stirred at a 40° C. water bath for 5 hours to obtain a clear precursor solution of $Zn_{0.995}Al_{0.005}O$. The precursor solution of $Zn_{0.995}Al_{0.005}O$ was placed in a 50° C. oven and aged for 90 hours to form an even $Zn_{0.995}Al_{0.005}O$ colloid.

18.7675 g of $Y(NO_3)_3.6H_2O$ and 0.4461 g of $Eu(NO_3)_3.6H_2O$ were weighed and dissolved in deionized water at room temperature to prepare a 100 ml of Y, Eu aqueous solution of 0.5 mol/L with a doping concentration of Eu in Y of 2%. 8 ml of Y, Eu aqueous solution of 0.50 mol/L were measured, 32 ml of anhydrous ethanol were added as solvent, 2.5 ml of Ag nano-particle solution of 0.001 mol/L was added, 7.6856 g of citric acid and 2 g of polyethylene glycol 8000 were added, stirred in a 40° C. water bath for 6 hours to obtain a clear precursor solution of Y, Eu colloid. The obtained precursor solution of Y, Eu colloid was placed in a 90° C. oven and aged for 60 hours to form an even Y, Eu colloid.

0.4ml of resulting $Zn_{0.995}Al_{0.005}O$ colloid was added into the Y, Eu colloid, the mixture was stirred in a 50° C. water bath for 2 hours, dried in a 150° C. oven for 96 hours, insulated in a 1300° C. muffle furnace for 0.5 hours to obtain $Y_2O_3$:Eu phosphor doped with Ag nano-particle and $Zn_{0.995}Al_{0.005}O$.

EXAMPLE 3

3.1937g of $Zn(CH_3COO)_2 \cdot 2H_2O$, 0.1688 g of $Al(NO_3)_3 \cdot 9H_2O$, and 0.9 ml $C_2H_7NO$ were weighed and placed in a vessel at room temperature. A methoxyethanol was added to make 50 ml, stirred at a 60° C. water bath for 8 hours to obtain a clear precursor solution of $Zn_{0.97}Al_{0.03}O$. The precursor solution of $Zn_{0.97}Al_{0.03}O$ was placed in a 60° C. oven and aged for 65 hours to form an even $Zn_{0.97}Al_{0.03}O$ colloid.

10.7260 g of $Y_2O_3$ and 0.8798 g of $Eu_2O_3$ were weighed and dissolved in 27 ml of hydrochloric acid at 60° C.; deionized water was added to prepare a 100 ml of Y, Eu aqueous solution of 1 mol/L with a doping concentration of Eu in Y of 5%. 8 ml of Y, Eu aqueous solution of 1.00 mol/L were measured, 32 ml of anhydrous ethanol were added as solvent, 1.6 ml of Pt nano-particle solution of 0.001 mol/L was added, 6.1485 g of citric acid and 5 g of polyethylene glycol 6000 were added, stirred in a 60° C. water bath for 4 hours to obtain a clear precursor solution of Y, Eu colloid. The obtained precursor solution of Y, Eu colloid was placed in a 70° C. oven and aged for 60 hours to form an even Y, Eu colloid.

26ml of resulting $Zn_{0.97}Al_{0.03}O$ colloid was added into the Y, Eu colloid, the mixture was stirred in a 80° C. water bath for 2 hours, dried in a 100° C. oven for 48 hours, insulated in an 800° C. muffle furnace for 2 hours to obtain $Y_2O_3$:Eu phosphor doped with Pt nano-particle and $Zn_{0.97}Al_{0.03}O$.

EXAMPLE 4

1.0865g of $Zn(CH_3COO)_2 \cdot 2H_2O$, 0.0188g of $Al(NO_3)_3 \cdot 9H_2O$, and 0.4 ml $C_2H_7NO$ were weighed and placed in a vessel at room temperature. A mixed solution containing ethanol and water with a volume ratio of 5:1 was added to make 50 ml, stirred at a 50° C. water bath for 6 hours to obtain a clear precursor solution of $Zn_{0.985}Al_{0.015}O$. The precursor solution of $Zn_{0.985}Al_{0.015}O$ was placed in a 60° C. oven and aged for 80 hours to form an even $Zn_{0.985}Al_{0.015}O$ colloid.

37.9180 g of $Y(NO_3)_3 \cdot 6H_2O$ and 0.4441 g of $Eu(NO_3)_3 \cdot 6H_2O$ were weighed and dissolved in deionized water at room temperature to prepare a 100 ml of Y, Eu aqueous solution of 1 mol/L with a doping concentration of Eu in Y of 1%. 20 ml of Y, Eu aqueous solution of 1 mol/L were measured, 20 ml of anhydrous ethanol were added as solvent, 0.4 ml of Pt nano-particle solution of 0.01 mol/L was added, 15.3712 g of citric acid and 5 g of polyethylene glycol 10000 were added, stirred in a 60° C. water bath for 4 hours to obtain a clear precursor solution of Y, Eu colloid. The obtained precursor solution of Y, Eu colloid was placed in an 80° C. oven and aged for 56 hours to form an even Y, Eu colloid.

1ml of resulting $Zn_{0.985}Al_{0.015}O$ colloid was added into the Y, Eu colloid, the mixture was stirred in a 60° C. water bath for 2 hours, dried in a 100° C. oven for 48 hours, insulated in an 800° C. muffle furnace for 2 hours to obtain $Y_2O_3$:Eu phosphor doped with Pd nano-particle and $Zn_{0.985}Al_{0.015}O$.

EXAMPLE 5

2.4810g of $ZnCl_2 \cdot 2H_2O$, 0.1448g of $AlCl_3 \cdot 6H_2O$, and 1.5 ml $C_4H_{11}NO_2$ were weighed and placed in a vessel at room temperature. A mixed solution containing ethanol and water with a volume ratio of 3:1 was added to make 50 ml, stirred at a 70° C. water bath for 8 hours to obtain a clear precursor solution of $Zn_{0.96}Al_{0.04}O$. The precursor solution of $Zn_{0.96}Al_{0.04}O$ was placed in a 60° C. oven and aged for 70 hours to form an even $Zn_{0.96}Al_{0.04}O$ colloid.

76.5254 g of $Y(NO_3)_3 \cdot 6H_2O$ and 0.0892 g of $Eu(NO_3)_3 \cdot 6H_2O$ were weighed and dissolved in deionized water to prepare a 100 ml of Y, Eu aqueous solution of 2 mol/L with a doping concentration of Eu of 0.1%. 20 ml of Y, Eu aqueous solution of 2.00 mol/L were measured, 20 ml of anhydrous ethanol were added as solvent, 0.8 ml of Ag nano-particle solution of 0.001 mol/L was added, 7.6856 g of citric acid and 8 g of polyethylene glycol 10000 were added, stirred in a 50° C. water bath for 6 hours to obtain a clear precursor solution of Y, Eu colloid. The obtained precursor solution of Y, Eu colloid was placed in a 60° C. oven and aged for 60 hours to form an even Y, Eu colloid.

6.7ml of resulting $Zn_{0.96}Al_{0.04}O$ colloid was added into the Y, Eu colloid, the mixture was stirred in a 80° C. water bath for 4 hours, dried in a 200° C. oven for 50 hours, insulated in a 1000° C. muffle furnace for 3 hours to obtain $Y_2O_3$:Eu phosphor doped with Ag nano-particle and $Zn_{0.96}Al_{0.04}O$.

EXAMPLE 6

1.0865g of $Zn(CH_3COO)_2 \cdot 2H_2O$, 0.0188 g of $Al(NO_3)_3 \cdot 9H_2O$, and 0.4 ml $C_2H_7NO$ were weighed and placed in a vessel at room temperature. A mixed solution containing ethanol and water with a volume ratio of 5:1 was added to make 50 ml, stirred at a 50° C. water bath for 6 hours to obtain a clear precursor solution of $Zn_{0.99}Al_{0.01}O$. The precursor solution of $Zn_{0.99}Al_{0.01}O$ was placed in a 70° C. oven and aged for 80 hours to form an even $Zn_{0.99}Al_{0.01}O$ colloid.

37.9180 g of $Y(NO_3)_3 \cdot 6H_2O$ and 0.4441 g of $Eu(NO_3)_3 \cdot 6H_2O$ were weighed and dissolved in deionized water at room temperature to prepare a 100 ml of Y, Eu aqueous solution of 1 mol/L with a doping concentration of Eu in Y of 1%. 20 ml of Y, Eu aqueous solution of 1.00 mol/L were measured, 20 ml of anhydrous ethanol were added as solvent, 2 ml of $H_2PdCl_4$ solution of 0.1 mol/L was added, 15.3712 g of citric acid and 5 g of polyethylene glycol 20000 were added, stirred in a 60° C. water bath for 4 hours to obtain a clear precursor solution of Y, Eu colloid. The obtained precursor solution of Y, Eu colloid was placed in an 80° C. oven and aged for 56 hours to form an even Y, Eu colloid.

1ml of resulting $Zn_{0.99}Al_{0.01}O$ colloid was added into the Y, Eu colloid, the mixture was stirred in a 60° C. water bath for 2 hours, dried in a 100° C. oven for 96 hours, insulated in an 800° C. muffle furnace for 6 hours to obtain $Y_2O_3$:Eu phosphor doped with Pd nano-particle and $Zn_{0.99}Al_{0.01}O$.

EXAMPLE 7

4.2583 g of $Zn(CH_3COO)_2 \cdot 2H_2O$, 0.2251 g of $Al(NO_3)_3 \cdot 9H_2O$, and 2 ml $C_4H_{11}NO_2$ were weighed and placed in a vessel at room temperature. A methoxyethanol was added to make 50 ml, was added to make 50 ml, stirred at a 60° C. water bath for 4 hours to obtain a clear precursor solution of $Zn_{0.97}Al_{0.03}O$. The precursor solution of $Zn_{0.97}Al_{0.03}O$ was placed in a 60° C. oven and aged for 78 hours to form an even $Zn_{0.97}Al_{0.03}O$ colloid.

37.5350 g of $Y(NO_3)_3 \cdot 6H_2O$ and 0.9061 g of $Tb(NO_3)_3 \cdot 6H_2O$ were weighed and dissolved in deionized water at room temperature to prepare a 100 ml of Y, Tb aqueous solution of 1 mol/L with a doping concentration of Tb in Y of 2%. 12 ml of Y, Tb aqueous solution of 1.00 mol/L were measured, 28 ml of anhydrous ethanol were added as solvent, 0.6 ml of Au nano-particle solution of 0.001 mol/L was added, 9.2227 g of citric acid and 5 g of polyethylene glycol 10000 were added, stirred in a 60° C. water bath for 4 hours to obtain a clear precursor solution of Y, Tb colloid. The obtained precursor solution of Y, Tb colloid was placed in a 90° C. oven and aged for 56 hours to form an even Y, Tb colloid.

15 ml of resulting $Zn_{0.97}Al_{0.03}O$ colloid was added into the Y, Tb colloid, the mixture was stirred in a 60° C. water bath for 2 hours, dried in a 100° C. oven for 96 hours, insulated in a 1000° C. muffle furnace for 2 hours in a carbon reducing atmosphere to obtain $Y_2O_3$:Tb phosphor doped with Au nano-particle and $Zn_{0.97}Al_{0.03}O$.

EXAMPLE 8

7.2984 g of $Zn(CH_3COO)_2.2H_2O$, 0.6565 g of $Al(NO_3)_3 \cdot 9H_2O$, and 6 ml $C_2H_7NO$ were weighed and placed in a vessel at room temperature. A mixed solution containing ethanol and water with a volume ratio of 6:1 was added to make 50ml, stirred at a 70° C. water bath for 5 hours to obtain a clear precursor solution of $Zn_{0.95}Al_{0.05}O$. The precursor solution of $Zn_{0.95}Al_{0.05}O$ was placed in a 60° C. oven and aged for 85 hours to form an even $Zn_{0.95}Al_{0.05}O$ colloid.

31.1728 g of $YCl_3$ and 1.1198 g of $TbCl_3.6H_2O$ were weighed and dissolved in deionized water at room temperature to prepare a 100 ml of Y, Tb aqueous solution of 1 mol/L with a doping concentration of Eu in Y of 3%. 4 ml of Y, Tb aqueous solution of 1.00 mol/L were measured, 36 ml of anhydrous ethanol were added as solvent, 0.4 ml of $H_2PtCl_6$ solution of 0.1 mol/L was added, 6.2125 g of citric acid and 5 g of polyethylene glycol 10000 were added, stirred in a 60° C. water bath for 5 hours to obtain a clear precursor solution of Y, Tb colloid. The obtained precursor solution of Y, Tb colloid was placed in a 60° C. oven and aged for 60 hours to form an even Y, Tb colloid.

4 ml of resulting $Zn_{0.95}Al_{0.05}O$ colloid was added into the Y, Tb colloid, the mixture was stirred in a 70° C. water bath for 4 hours, dried in a 180° C. oven for 60 hours, insulated in a 1000° C. muffle furnace under a hydrogen-nitrogen reducing atmosphere for 3 hours to obtain $Y_2O_3$:Tb phosphor doped with Pt nano-particle and $Zn_{0.95}Al_{0.05}O$.

EXAMPLE 9

2.9452 g of $Zn(NO_3)_2.6H_2O$, 0.0241 g of $AlCl_3.6H_2O$, and 0.6ml $C_2H_7NO$ were weighed and placed in a vessel at room temperature. A methoxyethanol was added to make 50 ml, stirred at a 60° C. water bath for 7 hours to obtain a clear precursor solution of $Zn_{0.99}Al_{0.01}O$. The precursor solution of $Zn_{0.99}Al_{0.01}O$ was placed in a 60° C. oven and aged for 56 hours to form an even $Zn_{0.99}Al_{0.01}O$ colloid.

28.6899 g of oxalate yttrium and 1.7201 g of oxalic acid europium were weighed and dissolved in 20 ml of nitrate at 15° C. with stirring; deionized water was added to prepare a 100 ml of Y, Eu aqueous solution of 1 mol/L with a doping concentration of Eu of 5%. 20 ml of Y, Eu aqueous solution of 1.00 mol/L were measured, 20 ml of anhydrous ethanol were added as solvent, 0.2 ml of $HAuCl_4$ solution of 0.1 mol/L was added, 7.6856 g of citric acid and 5 g of polyethylene glycol 10000 were added, stirred in a 60° C. water bath for 4 hours to obtain a clear precursor solution of Y, Eu colloid. The obtained precursor solution of Y, Eu colloid was placed in a 60° C. oven and aged for 60 hours to form an even Y, Eu colloid.

5 ml of resulting $Zn_{0.99}Al_{0.01}O$ colloid was added into the Y, Eu colloid, the mixture was stirred in an 80° C. water bath for 2 hours, dried in a 100° C. oven for 56 hours, insulated in an 800° C. muffle furnace for 2 hours to obtain $Y_2O_3$:Eu phosphor doped with Au nano-particle and $Zn_{0.99}Al_{0.01}O$.

EXAMPLE 10

9.8596 g of $ZnSO4.7H_2O$, 0.2395g of $Al_2(SO_4)_3$, and 4.7 ml $C_6H_{15}O_3N$ were weighed and placed in a vessel at room temperature. A methoxyethanol was added to make 50 ml, stirred at a 60° C. water bath for 5 hours to obtain a clear precursor solution of $Zn_{0.98}Al_{0.02}O$. The precursor solution of $Zn_{0.98}Al_{0.02}O$ was placed in a 60° C. oven and aged for 60 hours to form an even $Zn_{0.98}Al_{0.02}O$ colloid.

11.0647 g of $Y_2O_3$ and 0.3739 g of $Tb_4O_7$ were weighed and dissolved in 27 ml of hydrochloric acid at 100° C. with stirring; deionized water was added to prepare a 100 ml of Y, Tb aqueous solution of 1 mol/L with a doping concentration of Tb of 2%. 15 ml of Y, Tb aqueous solution of 1.00 mol/L were measured, 25 ml of anhydrous ethanol were added as solvent, 0.75 ml of $HAuCl_4$ solution of 0.01 mol/L was added, 5.7642 g of citric acid and 5 g of polyethylene glycol 10000 were added, stirred in a 50° C. water bath for 5 hours to obtain a clear precursor solution of Y, Tb colloid. The obtained precursor solution of Y, Tb colloid was placed in a 90° C. oven and aged for 60 hours to form an even Y, Tb colloid.

10 ml of resulting $Zn_{0.98}Al_{0.02}O$ colloid was added into the Y, Tb colloid, the mixture was stirred in a 60° C. water bath for 2 hours, dried in a 130° C. oven for 59 hours, insulated in a 1100° C. muffle furnace under a hydrogen-nitrogen reducing atmosphere for 2 hours to obtain $Y_2O_3$:Tb phosphor doped with Au nano-particle and $Zn_{0.98}Al_{0.02}O$.

EXAMPLE 11

2.1292 g of $Zn(CH_3COO)_2.2H_2O$, 0.1125 g of $Al(NO_3)_3 \cdot 9H_2O$, and 0.6 ml $C_2H_7NO$ were weighed and placed in a vessel at room temperature. A methoxyethanol was added to make 50 ml, was added to make 50 ml, stirred at a 60° C. water bath for 4 hours to obtain a clear precursor solution of $Zn_{0.97}Al_{0.03}O$. The precursor solution of $Zn_{0.97}Al_{0.03}O$ was placed in a 60° C. oven and aged for 70 hours to form an even $Zn_{0.97}Al_{0.03}O$ colloid.

37.9180 g of $Y(NO_3)_3.6H_2O$ and 0.4441 g of $Eu(NO_3)_3 \cdot 6H_2O$ were weighed and dissolved in deionized water at room temperature to prepare a 100 ml of Y, Eu aqueous solution of 1 mol/L with a doping concentration of Tb in Y of 1%. 4 ml of Y, Eu aqueous solution of 1.00 mol/L were measured, 1 ml of deionized water and 35 ml of anhydrous ethanol were added as solvent, 2.0 ml of Pd nano-particle solution of 0.01 mol/L was added, 3.0742 g of citric acid and 5 g of polyethylene glycol 10000 were added, stirred in a 60° C. water bath for 4 hours to obtain a clear precursor solution of Y, Eu colloid. The obtained precursor solution of Y, Eu colloid was placed in a 90° C. oven and aged for 40 hours to form an even Y, Eu colloid.

1 ml of resulting $Zn_{0.97}Al_{0.03}O$ colloid was added into the Y, Eu colloid, the mixture was stirred in a 60° C. water bath for 2 hours, dried in a 130° C. oven for 59 hours, insulated in a 1100° C. muffle furnace for 2 hours in a carbon reducing atmosphere to obtain $Y_2O_3$:Eu phosphor doped with Pd nano-particle and $Zn_{0.97}Al_{0.03}O$.

EXAMPLE 12

6.9733 g of $ZnSO4.7H_2O$, 0.1283g of $Al_2(SO_4)_3$, and 1.5 ml $C_2H_7NO$ were weighed and placed in a vessel at room temperature. A mixed solution containing ethanol and water with a volume ratio of 7:1 was added to make 50 ml, stirred at a 60° C. water bath for 5 hours to obtain a clear precursor solution of $Zn_{0.985}Al_{0.015}O$. The precursor solution of $Zn_{0.985}Al_{0.015}O$ was placed in a 60° C. oven and aged for 90 hours to form an even $Zn_{0.985}Al_{0.015}O$ colloid.

27.1780 g of oxalic yttrium, and 3.5099 g of oxalic acid terbium were weighed and dissolved in 20 ml of nitrate at 15° C. with stirring; deionized water was added to prepare a 100 ml of Y, Tb aqueous solution of 1 mol/L with a doping concentration of Tb of 10%. 10 ml of Y, Tb aqueous solution of 1.00 mol/L were measured, 30 ml of anhydrous ethanol were added as solvent, 0.8 ml of $AgNO_3$ solution of 0.1 mol/L was added, 7.6858 g of citric acid and 5 g of polyethylene glycol 10000 were added, stirred in a 60° C. water bath for 4 hours to obtain a clear precursor solution of Y, Tb colloid. The obtained precursor solution of Y, Tb colloid was placed in an 80° C. oven and aged for 50 hours to form an even Y, Tb colloid.

10 ml of resulting $Zn_{0.985}Al_{0.015}O$ colloid was added into the Y, Tb colloid, the mixture was stirred in a 60° C. water bath for 2 hours, dried in a 100° C. oven for 53 hours, insulated in a 1300° C. muffle furnace under a hydrogen-nitrogen reducing atmosphere for 2 hours to obtain $Y_2O_3$:Tb phosphor doped with Ag nano-particle and $Zn_{0.985}Al_{0.15}O$.

EXAMPLE 13

2.4810 g of $ZnCl_2.2H_2O$, 0.1448 g of $AlCl_3.6H_2O$, and 1.5 ml $C_4H_{11}NO_2$ were weighed and placed in a vessel at room temperature. A mixed solution containing ethanol and water with a volume ratio of 3:1 was added to make 50 ml, stirred at a 70° C. water bath for 8 hours to obtain a clear precursor solution of $Zn_{0.96}Al_{0.04}O$. The precursor solution of $Zn_{0.96}Al_{0.04}O$ was placed in a 60° C. oven and aged for 70 hours to form an even $Zn_{0.96}Al_{0.04}O$ colloid.

76.5254 g of $Y(NO_3)_3.6H_2O$ and 0.0892 g of $Eu(NO_3)_3.6H_2O$ were weighed and dissolved in deionized water to prepare a 100 ml of Y, Eu aqueous solution of 2 mol/L with a doping concentration of Eu of 0.1%. 20 ml of Y, Eu aqueous solution of 2.00 mol/L were measured, 20 ml/L of anhydrous ethanol were added as solvent, 2.0 ml of Pd nano-particle solution of 0.01 mol/L was added, 7.6856 g of citric acid and 8 g of polyethylene glycol 10000 were added, stirred in a 50° C. water bath for 6 hours to obtain a clear precursor solution of Y, Eu colloid. The obtained precursor solution of Y, Eu colloid was placed in a 60° C. oven and aged for 60 hours to form an even Y, Eu colloid.

6.7 ml of resulting $Zn_{0.96}Al_{0.04}O$ colloid was added into the Y, Eu colloid, the mixture was stirred in a 60° C. water bath for 2 hours, dried in a 130° C. oven for 59 hours, insulated in a 1200° C. muffle furnace for 2 hours to obtain $Y_2O_3$:Eu phosphor doped with Pd nano-particle and $Zn_{0.96}Al_{0.04}O$.

EXAMPLE 14

0.5460 g of $Zn(CH_3COO)_2.2H_2O$, 0.0047 g of $Al(NO_3)_3.9H_2O$, and 0.4 ml $C_6H_{15}O_3N$ were weighed and placed in a vessel at room temperature. A mixed solution containing ethanol and water with a volume ratio of 4:1 was added to make 50ml, stirred at a 40° C. water bath for 5 hours to obtain a clear precursor solution of $Zn_{0.995}Al_{0.005}O$. The precursor solution of $Zn_{0.995}Al_{0.005}O$ was placed in a 60° C. oven and aged for 90 hours to form an even $Zn_{0.995}Al_{0.005}O$ colloid.

18.7675 g of $Y(NO_3)_3.6H_2O$ and 0.4461 g of $Eu(NO_3)_3.6H_2O$ were weighed and dissolved in deionized water at room temperature to prepare a 100 ml of Y, Eu aqueous solution of 0.5 mol/L with a doping concentration of Eu in Y of 2%. 8 ml of Y, Eu aqueous solution of 0.50 mol/L were measured, 32 ml of anhydrous ethanol were added as solvent, 0.8 ml of $HAuCl_4$ solution of 0.01 mol/L was added, 7.6856 g of citric acid and 2 g of polyethylene glycol 10000 were added, stirred in a 40° C. water bath for 6 hours to obtain a clear precursor solution of Y, Eu colloid. The obtained precursor solution of Y, Eu colloid was placed in a 90° C. oven and aged for 60 hours to form an even Y, Eu colloid.

0.4 ml of resulting $Zn_{0.995}Al_{0.005}O$ colloid was added into the Y, Eu colloid, the mixture was stirred in a 60° C. water bath for 2 hours, dried in a 130° C. oven for 59 hours, insulated in an 1200° C. muffle furnace for 2 hours to obtain $Y_2O_3$:Eu phosphor doped with Au nano-particle and $Zn_{0.995}Al_{0.005}O$.

EXAMPLE 15

3.1937 g of $Zn(CH_3COO)_2.2H_2O$, 0.1688 g of $Al(NO_3)_3.9H_2O$, and 0.9 ml $C_2H_7NO$ were weighed and placed in a vessel at room temperature. A methoxyethanol was added to make 50ml, stirred at a 60° C. water bath for 8 hours to obtain a clear precursor solution of $Zn_{0.97}Al_{0.03}O$. The precursor solution of $Zn_{0.97}Al_{0.03}O$ was placed in a 60° C. oven and aged for 65 hours to form an even $Zn_{0.97}Al_{0.03}O$ colloid.

10.7260 g of $Y_2O_3$ and 0.8798 g of $Eu_2O_3$ were weighed and dissolved in 27 ml of hydrochloric acid at 60° C. with stirring, deionized water was added to prepare a 100 ml of Y, Eu aqueous solution of 1 mol/L with a doping concentration of Eu in Y of 5%. 8 ml of Y, Eu aqueous solution of 1.00 mol/L were measured, 32 ml of anhydrous ethanol were added as solvent, 1.6 ml of Au nano-particle solution of 0.001 mol/L was added, 6.1485 g of citric acid and 5 g of polyethylene glycol 6000 were added, stirred in a 60° C. water bath for 4 hours to obtain a clear precursor solution of Y, Eu colloid. The obtained precursor solution of Y, Eu colloid was placed in a 70° C. oven and aged for 60 hours to form an even Y, Eu colloid.

26 ml of resulting $Zn_{0.97}Al_{0.03}O$ colloid was added into the Y, Eu colloid, the mixture was stirred in a 75° C. water bath for 2 hours, dried in a 100° C. oven for 48 hours, insulated in an 800° C. muffle furnace for 2 hours to obtain $Y_2O_3$:Eu phosphor doped with Au nano-particle and $Zn_{0.97}Al_{0.03}O$.

EXAMPLE 16

2.9452 g of $Zn(NO_3)_2.6H_2O$, 0.0241 g of $AlCl_3.6H_2O$, and 0.6ml $C_2H_7NO$ were weighed and placed in a vessel at room temperature. A methoxyethanol was added to make 50 ml, stirred at a 60° C. water bath for 7 hours to obtain a clear precursor solution of $Zn_{0.99}Al_{0.01}O$. The precursor solution of $Zn_{0.99}Al_{0.01}O$ was placed in a 60° C. oven and aged for 56 hours to form an even $Zn_{0.99}Al_{0.01}O$ colloid.

28.6899 g of oxalate yttrium and 1.7201 g of oxalic acid europium were weighed and dissolved in 20 ml of nitrate; deionized water was added to prepare a 100 ml of Y, Eu aqueous solution of 1 mol/L with a doping concentration of Eu of 5%. 20 ml of Y, Eu aqueous solution of 1.00 mol/L were measured, 20 ml of anhydrous ethanol were added as solvent, 0.4 ml of $AgNO_3$ solution of 0.1 mol/L was added, 7.6858 g of citric acid and 5 g of polyethylene glycol 10000 were added, stirred in a 60° C. water bath for 4 hours to obtain a clear precursor solution of Y, Eu colloid. The obtained precursor solution of Y, Eu colloid was placed in a 60° C. oven and aged for 60 hours to form an even Y, Eu colloid.

5 ml of resulting $Zn_{0.99}Al_{0.01}O$ colloid was added into the Y, Eu colloid, the mixture was stirred in a 65° C. water bath for 2 hours, dried in a 100° C. oven for 48 hours, insulated in a 900° C. muffle furnace for 2 hours to obtain $Y_2O_3$:Eu phosphor doped with Ag nano-particle and $Zn_{0.99}Al_{0.01}O$.

EXAMPLE 17

4.2583 g of $Zn(CH_3COO)_2 \cdot 2H_2O$, 0.2251 g of $Al(NO_3)_3 \cdot 9H_2O$, and 2 ml $C_4H_{11}NO_2$ were weighed and placed in a vessel at room temperature. A methoxyethanol was added to make 50 ml, was added to make 50 ml, stirred at a 60° C. water bath for 4 hours to obtain a clear precursor solution of $Zn_{0.97}Al_{0.03}O$. The precursor solution of $Zn_{0.97}Al_{0.03}O$ was placed in a 60° C. oven and aged for 78 hours to form an even $Zn_{0.97}Al_{0.03}$ colloid.

37.5350 g of $Y(NO_3)_3 \cdot 6H_2O$ and 0.9061 g of $Tb(NO_3)_3 \cdot 6H_2O$ were weighed and dissolved in deionized water at room temperature to prepare a 100 ml of Y, Tb aqueous solution of 1 mol/L with a doping concentration of Tb in Y of 2%. 12 ml of Y, Tb aqueous solution of 1.00 mol/L were measured, 28 ml of anhydrous ethanol were added as solvent, 0.24 ml of Pt nano-particle solution of 0.001 mol/L was added, 9.2227 g of citric acid and 5 g of polyethylene glycol 10000 were added, stirred in a 60° C. water bath for 4 hours to obtain a clear precursor solution of Y, Tb colloid. The obtained precursor solution of Y, Tb colloid was placed in a 90° C. oven and aged for 56 hours to form an even Y, Tb colloid.

15 ml of resulting $Zn_{0.97}Al_{0.03}O$ colloid was added into the Y, Tb colloid, the mixture was stirred in a 55° C. water bath for 2.5 hours, dried in a 150° C. oven for 90 hours, insulated in a 1300° C. muffle furnace for 0.5 hour in a carbon reducing atmosphere to obtain $Y_2O_3$:Tb phosphor doped with Pt nano-particle and $Zn_{0.97}Al_{0.03}O$.

EXAMPLE 18

6.9733 g of $ZnSO_4 \cdot 7H_2O$, 0.1283 g of $Al_2(SO_4)_3$, and 1.5 ml $C_2H_7NO$ were weighed and placed in a vessel at room temperature. A mixed solution containing ethanol and water with a volume ratio of 7:1 was added to make 50 ml, stirred at a 60° C. water bath for 5 hours to obtain a clear precursor solution of $Zn_{0.985}Al_{0.15}O$. The precursor solution of $Zn_{0.985}Al_{0.015}O$ was placed in a 60° C. oven and aged for 90 hours to form an even $Zn_{0.985}Al_{0.015}O$ colloid.

27.1780 g of oxalic yttrium and 3.5099 g of oxalic acid terbium were weighed and dissolved in 20 ml of nitrate at 15° C. with stirring; deionized water was added to prepare a 100 ml of Y, Tb aqueous solution of 1 mol/L with a doping concentration of Tb of 10%. 10 ml of Y, Tb aqueous solution of 1.00 mol/L were measured, 30 ml of anhydrous ethanol were added as solvent, 0.1 ml of $H_2PdCl_4$ solution of 0.1 mol/L was added, 7.6858 g of citric acid and 5 g of polyethylene glycol 6000 were added, stirred in a 60° C. water bath for 4 hours to obtain a clear precursor solution of Y, Tb colloid. The obtained precursor solution of Y, Tb colloid was placed in an 80° C. oven and aged for 50 hours to form an even Y, Tb colloid.

10 ml of resulting $Zn_{0.985}Al_{0.015}O$ colloid was added into the Y, Tb colloid, the mixture was stirred in a 80° C. water bath for 1 hour, dried in a 170° C. oven for 96 hours, insulated in a 800° C. muffle furnace under a carbon reducing atmosphere for 0.5 hour to obtain $Y_2O_3$:Tb phosphor doped with Pd nano-particle and $Zn_{0.985}Al_{0.015}O$.

EXAMPLE 19

9.6620 g of $ZnSO_4 \cdot 7H_2O$, 0.2395g of $Al_2(SO_4)_3$, and 4.7 ml $C_6H_{15}O_3N$ were weighed and placed in a vessel at room temperature. A methoxyethanol was added to make 50ml, stirred at a 60° C. water bath for 5 hours to obtain a clear precursor solution of $Zn_{0.98}Al_{0.02}O$. The precursor solution of $Zn_{0.98}Al_{0.02}O$ was placed in a 60° C. oven and aged for 60 hours to form an even $Zn_{0.98}Al_{0.02}O$ colloid.

11.0647 g of $Y_2O_3$ and 0.3739 g of $Tb_4O_7$ were weighed and dissolved in 27 ml of hydrochloric acid at 100° C. with stirring; deionized water was added to prepare a 100 ml of Y, Tb aqueous solution of 1 mol/L with a doping concentration of Tb of 2%. 15 ml of Y, Tb aqueous solution of 1.00 mol/L were measured, 25 ml of anhydrous ethanol were added as solvent, 3.0 ml of Ag nano-particle solution of 0.001 mol/L was added, 5.7642 g of citric acid and 5 g of polyethylene glycol 10000 were added, stirred in a 50° C. water bath for 5 hours to obtain a clear precursor solution of Y, Tb colloid. The obtained precursor solution of Y, Tb colloid was placed in a 90° C. oven and aged for 60 hours to form an even Y, Tb colloid.

10 ml of resulting $Zn_{0.98}Al_{0.02}O$ colloid was added into the Y, Tb colloid, the mixture was stirred in a 50° C. water bath for 2 hours, dried in a 180° C. oven for 85 hours, insulated in a 1300° C. muffle furnace under a carbon reducing atmosphere for 0.5 hour to obtain $Y_2O_3$:Tb phosphor doped with Ag nano-particle and $Zn_{0.98}Al_{0.02}O$.

EXAMPLE 20

7.2984 g of $Zn(CH_3COO)_2 2H_2O$, 0.6565 g of $Al(NO_3)_3 \cdot 9H_2O$, and 6 ml $C_2H_7NO$ were weighed and placed in a vessel at room temperature. A mixed solution containing ethanol and water with a volume ratio of 6:1 was added to make 50 ml, stirred at a 70° C. water bath for 5 hours to obtain a clear precursor solution of $Zn_{0.95}Al_{0.05}O$. The precursor solution of $Zn_{0.95}Al_{0.05}O$ was placed in a 60° C. oven and aged for 85 hours to form an even $Zn_{0.95}Al_{0.05}O$ colloid.

31.1728 g of $YCl_3$ and 1.1198 g of $TbCl_3 \cdot 6H_2O$ were weighed and dissolved in deionized water at room temperature to prepare a 100 ml of Y, Tb aqueous solution of 1 mol/L with a doping concentration of Eu in Y of 3%. 4 ml of Y, Tb aqueous solution of 1.00 mol/L were measured, 36 ml of anhydrous ethanol were added as solvent, 2.0 ml of Pt nano-particle solution of 0.001 mol/L was added, 6.2125 g of citric acid and 5 g of polyethylene glycol 10000 were added, stirred in a 60° C. water bath for 5 hours to obtain a clear precursor solution of Y, Tb colloid. The obtained precursor solution of Y, Tb colloid was placed in a 60° C. oven and aged for 60 hours to form an even Y, Tb colloid.

4 ml of resulting $Zn_{0.95}Al_{0.05}O$ colloid was added into the Y, Tb colloid, the mixture was stirred in a 75° C. water bath for 3.5 hours, dried in a 160° C. oven for 96 hours, insulated in a 1300° C. muffle furnace under a carbon reducing atmosphere for 6 hours to obtain $Y_2O_3$:Tb phosphor doped with Pt nano-particle and $Zn_{0.95}Al_{0.05}O$.

Although the invention has been described in language specific to structural features and/or methodological acts, it is to be understood that the invention defined in the appended claims is not necessarily limited to the specific features or acts described. Rather, the specific features and acts are disclosed as sample forms of implementing the claimed invention.

What is claimed is:

1. An yttrium oxide phosphor mixture comprising:
   M, $Zn_{1-x}Al_xO$ and $Y_2O_3$: Re;
   wherein Re is at least one selected from Eu and Tb, M is at least one selected from the group consisting Ag, Au, Pt and Pd in the form of nano-particle, and $0<x\leq0.05$.

2. The yttrium oxide phosphor mixture according to claim 1, wherein the doping concentration of Re in $Y_2O_3$ is from 0.1% to 10%;

the mole ratio of M to the sum of Re and Y is from 0.00002:1 to 0.01:1;

the mole ratio of $Zn_{1-x}Al_xO$ to the sum of Re and Y is from 0.01:1 to 2:1.

3. A preparation method of an yttrium oxide phosphor mixture, comprising the following steps:

S1, preparing a $Zn_{1-x}Al_xO$ colloid, wherein $0<x\leq0.05$;

S2, preparing a Y, Re colloid containing metal nano-particle M or ion M, wherein Re is at least one selected from Eu and Tb, M is at least one selected from the group consisting Ag, Au, Pt and Pd; and S3, mixing the $Zn_{1-x}Al_xO$ colloid with the Y, Re colloid containing M in water bath with stirring to produce a mixture colloid, aging and heat treating the mixture colloid to obtain the yttrium oxide phosphor.

4. The preparation method of the yttrium oxide phosphor mixture according to claim 3, wherein the step S1 comprises: weighing raw materials of zinc salt and aluminum salt, respectively; dissolving with a solvent; adding stabilizing agent to prepare a mixed solution having a total mole concentration of zinc ion and aluminum ion of 0.05 to 0.70 mol/L; stirring the mixed solution in a water bath of 40° C. to 70° C. for 4 to 8 hours to obtain a precursor solution of $Zn_{1-x}Al_xO$; placing the precursor solution of $Zn_{1-x}Al_xO$ in a 60° C. to 90° C. oven and aging for 40 to 60 hours to obtain the $Zn_{1-x}Al_xO$ colloid.

5. The preparation method of the yttrium oxide phosphor mixture according to claim 4, wherein the zinc salt is selected from at least one of the group consisting of $Zn(CH_3COO)_2 \cdot 2H_2O$, $Zn(NO_3)_2 \cdot 6H_2O$, $ZnCl_2 \cdot 2H_2O$ and $ZnSO_4 \cdot 7H_2O$;

the aluminum salt is selected from at least one of the group consisting of $Al(NO_3)_3 \cdot 9H_2O$, $AlCl_3 \cdot 6H_2O$ and $Al_2(SO_4)_3$;

the solvent is selected from at least one of the group consisting of $C_3H_8O_2$ and aqueous ethanol solution; and the volume ratio of ethanol to deionized water of the aqueous ethanol solution is in a range of 3:1 to 7:1; and the stabilizing agent is selected from at least one of the group consisting of $C_2H_7NO$, $C_4H_{11}NO_2$ and $C_6H_{15}O_3N$.

6. The preparation method of the yttrium oxide phosphor mixture according to claim 3, wherein the step S2 comprises:

S21, weighing raw materials of Y and Re respectively according to a doping concentration of Re in $Y_2O_3$ of 0.1% to 10% to prepare a Y, Re solution having a sum ion concentration of 0.1 mol/L to 2.00 mol/L; wherein the Y, Re solution is a Y, Re aqueous solution or an aqueous ethanol solution;

S22, measuring the Y, Re solution, adding ethanol, raw material of M, a complexing agent and a surfactant, successively, to prepare a Y, Re alcohol aqueous solution; wherein the ratio of water to alcohol in the Y, Re alcohol aqueous solution is from 1:1 to 9:1, the sum of mole concentration of Y and Re is 0.1 mol/L to 1.0 mol/L, the mole ratio of the complexing agent to the sum of Y and Re is from 1:1 to 5:1, the concentration of the surfactant is 0.05 mol/L to 20 mol/L; wherein deionized water can be added to prepare the Y, Re alcohol aqueous solution; and S23, stirring the Y, Re alcohol aqueous solution in a water bath of 40° C. to 60° C. for 4 to 6 hours, and placing the Y, Re alcohol aqueous solution in a 60° C. to 90° C. oven and aging for 56 to 90 hours to obtain the Y, Re colloid containing metal nano-particle M or ion M.

7. The preparation method of the yttrium oxide phosphor mixture according to claim 6, wherein the raw materials of Y and Re are metal oxides, hydrochloric acid salts, nitrates, or oxalates;

the raw material of M is Ag, Au, Pt and Pd in the form of nano-particle;

the raw material of M is aqueous or alcohol solution of $AgNO_3$, $HAuCl_4$, $H_2PtCl_6$, $H_2PdCl_4$;

the complexing agent is citric acid; and the surfactant is selected from at least one of the group consisting of polyethylene glycol 6000, polyethylene glycol 8000, polyethylene glycol 10000 and polyethylene glycol 20000.

8. The preparation method of the yttrium oxide phosphor mixture according to claim 7, wherein the metal oxides are $Y_2O_3$, $Eu_2O_3$, $Tb_4O_7$;

the hydrochloric acid salts are $YCl_3 \cdot 7H_2O$, $EuCl_3$, $TbCl_3 \cdot 6H_2O$;

the nitrates are $Y(NO_3)_3 \cdot 6H_2O$, $Eu(NO_3)_3 \cdot 6H_2O$, $Tb(NO_3)_3 \cdot 6H_2O$.

9. The preparation method of the yttrium oxide phosphor mixture according to claim 7, wherein during the preparation of the Y, Re aqueous solution, if the hydrochloric acid salts or the nitrates are used as the raw materials of Y and/or Re, the raw materials of Y and/or Re are dissolved in a vessel directly;

If the metal oxides or the oxalates are used as the raw materials of Y and/or Re, the metal oxides or the oxalates corresponding to the Y, Re are dissolved in a vessel with hydrochloric acid or nitric acid under a condition of 15° C. to 100° C. with stirring.

10. The preparation method of the yttrium oxide phosphor mixture according to claim 3, wherein in step S3, the ratio of the sum of molar amount of Zn and Al to the sum of molar amount of Re and Y in the mixture colloid is in a range of 0.01:1 to 2:1;

the temperature of water bath is 15° C. to 80° C., the stirring time is 1 to 4 hours;

the aging is placing the mixture colloid in a 100° C. to 200° C. oven for 48 to 96 hours; and the heat treating is placing the mixture colloid in a crucible at 800° C. to 1300° C. for 0.5 to 6 hours under an air atmosphere or a reducing atmosphere.

* * * * *